United States Patent [19]

Petrella

[11] Patent Number: 5,057,480
[45] Date of Patent: Oct. 15, 1991

[54] BLOWING REACTION CATALYST COMPOSITION THAT PROVIDES CELL OPENING OF THE RESULTING POLYURETHANE FOAM

[75] Inventor: Robert G. Petrella, Allentown, Pa.

[73] Assignee: Air Products and Chemicals, Inc., Allentown, Pa.

[21] Appl. No.: 667,998

[22] Filed: Mar. 12, 1991

Related U.S. Application Data

[62] Division of Ser. No. 652,143, Feb. 7, 1991.

[51] Int. Cl.$^5$ ............................................. B01J 31/02
[52] U.S. Cl. ..................................... 502/167; 521/129
[58] Field of Search ......................................... 502/167

[56] References Cited

U.S. PATENT DOCUMENTS

| | | | |
|---|---|---|---|
| 4,038,210 | 7/1977 | Rosemund et al. | 502/167 |
| 4,122,038 | 10/1978 | Sandner et al. | 502/167 X |
| 4,617,286 | 10/1986 | Arai et al. | 502/167 |

Primary Examiner—Patrick P. Garvin
Attorney, Agent, or Firm—Michael Leach; James C. Simmons; William F. Marsh

[57] ABSTRACT

A method for preparing a polyurethane foam which comprises reacting inorganic polyisocyanate and a polyol in the presence of a catalyst composition comprising a blowing catalyst and a gelling catalyst, the improvement which comprises employing a blowing catalyst consisting essentially of
(a) 25 to 80 wt % pentamethyldiethylenetriamine and
(b) 20 to 75 wt % bis(dimethylaminopropyl)methylamine.

The catalyst composition provides the resulting polyurethane foam with improved breathability.

7 Claims, No Drawings

BLOWING REACTION CATALYST COMPOSITION THAT PROVIDES CELL OPENING OF THE RESULTING POLYURETHANE FOAM

This is a division of Application Ser. No. 07/652,143 filed Feb. 7, 1991.

TECHNICAL FIELD

This invention relates to tertiary amine catalyst compositions for making polyurethane foam.

BACKGROUND OF THE INVENTION

Molded polyurethane foams are used extensively in various seating applications, including automobile seats. In order to provide comfortable seating, the current polyurethane foams must have breathability. The present method of attaining breathability involves the combination of mechanical and/or vacuum crushing with the appropriate silicone surfactants in the polyurethane foam formulation to provide maximum cell openness.

A typical solution to improving the air flow of molded foams is to select less stabilizing silicone surfactants for molded foam formulations. These less effective surfactants will provide more cell opening; i.e., better air flow values; however, more processing problems and overall rising foam instability are offsetting disadvantages. A second practice is to use a mixture of standard silicone surfactant with a dimethylsiloxane fluid. The dimethylsiloxane fluids are normally used as defoamers. These silicone blends work, but again, tradeoffs in rising foam stability and processing latitude are necessary.

Catalyst compositions used in making polyurethane foam typically comprise a combination of a blowing catalyst and a gelling catalyst. The blowing catalyst influences the isocyanate-water reaction. Bis(dimethylaminoethyl)ether [BDMAEE] is a commonly used blowing catalyst. Polyurethane catalysts are not considered to have cell opening effects. At the levels used in industry to achieve optimum productivity, catalysts are typically blamed for decreasing cell openness by increasing the polymerization rate to polyurethane.

The polyol suppliers have worked at producing modifications of their products to improve cell opening. In addition, low levels of selected polyols are sold as cell opening modifiers. These polyols are typically low molecular weight polyols used in rigid foam applications.

SUMMARY OF THE INVENTION

The present invention provides a catalyst composition for making a polyurethane foam product that has improved breathability. The catalyst composition consists essentially of 25 to 80 wt % pentamethyldiethylenetriamine [PMDETA] and 20 to 75 wt % bis(dimethylaminopropyl)methylamine [BDMAPMA].

The use of the catalyst composition improves the air flow of molded polyurethane foams which are prepared by reacting organic polyisocyanates with polyols when substituted for a typically used blowing catalyst, such as, BDMAEE.

When the catalyst composition is used at 1.4 to 1.8 times the BDMAEE levels in the polyurethane foam formulation, it produces essentially equivalent reaction times and more open cell foams. In addition, the gelling catalyst levels used in conjunction with the catalyst composition can be 20 to 40% less than the levels used with BDMAEE. The resulting polyurethane foams are comparable in all physical properties tested, except air flows where the foams made with the catalyst composition of the invention are superior.

DETAILED DESCRIPTION OF THE INVENTION

The polyurethane foams are prepared using suitable organic polyisocyanates well known in the art, including hexamethylene diisocyanate, phenylene diisocyanate, toluene diisocyanate and 4,4'-diphenylmethane diisocyanate. Especially suitable are the 2,4- and 2,6-toluene diisocyanates ("TDI") individually or together as their commercially available mixtures. Other suitable isocyanates are mixtures of diisocyanates known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates comprising a partially prereacted mixture of polyisocyanates and polyether or polyester polyols.

Illustrative of suitable polyols as a component of the polyurethane foam composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds including diols and triols, for example, among others, ethylene glycol, propylene glycol, 1,3-butane diol, 2,4-butane diol, 1,6-hexane diol, neopentyl glycol, diethylene glycol, dipropylene glycol, pentaerythritol, glycerol, diglycerol, trimethylol propane, cyclohexane diol and like low molecular weight polyols.

Useful polyester polyols include those produced by reacting a dicarboxylic acid with an excess of a diol, for example, adipic acid with ethylene glycol or butane diol, or reacting a lactone with an excess of a diol such as caprolactone and propylene glycol.

In addition to the polyether and polyester polyols, the masterbatches, or premix compositions, frequently contain a polymer polyol. Polymer polyols are used in polyurethane foam to increase the foam's resistance to deformation, i.e. to increase the load bearing properties of the foam. Currently, two different types of polymer polyols are used to achieve load bearing improvement. The first type, described as a graft polyol, consists of a triol on which vinyl monomers are graft copolymerized. Styrene and acrylonitrile are the usual monomers of choice. The second type, polyurea modified polyols, is a polyol containing a polyurea dispersion formed by the reaction of a diamine and toluenediisocyanate (TDI). Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load bearing requirements, polymer polyols may comprise 20 to 80% of the polyol portion of the masterbatch.

Other typical agents found in the polyurethane foam formulations include crosslinkers such as diethanolamine, diisopropanolamine, triethanolamine and/or tripropanolamine, blowing agents such as water, methylene chloride, tricholofluoromethane and the like, and cell stabilizers such as silicones.

A general polyurethane foam formulation containing the blowing out of the water would comprise the following components in parts by weight (pbw):

| Flexible Foam Formulation | |
| --- | --- |
| | Parts by Weight |
| Triol Ethylene Oxide Capped Polyol (4,000–6,000 Mol Wt) | 20 to 80 |
| Polymer Polyol (5,000–6,000 Mol Wt) | 80 to 20 |
| Silicone Surfactant | 1 to 2.5 |
| Blowing Agent | 2 to 4.5 |
| Crosslinker | 0.5 to 2 |
| Blowing Catalyst | 0.1 to 0.7 |
| Gelling Catalyst | 0.1 to 0.6 |
| Isocyanate Index | 92 to 115 |

The blowing catalyst composition for improving the air flow of the resulting foam product consists essentially of (a) 25 to 80 wt %, preferably 30 to 70 wt %, PMDETA, and
(b) 20 to 75 wt %, preferably 30 to 70 wt %, BMAPMA.

In addition to the above blowing catalyst composition, the polyurethane foam composition would also contain any tertiary amine gelling catalyst well known in the art, such as, for example, triethylenediamine and bis(dimethylaminopropyl)methylamine.

A catalytically effective amount of the blowing catalyst composition is used in the polyurethane foam formulation. More specifically, suitable amounts of the blowing catalyst composition may range from about 0.1 to 0.7 parts per hundred parts polyol in the polyurethane formulation.

EXAMPLE 1

In order to demonstrate the performance of the blowing catalyst composition according to the invention, foams were prepared using the following two polyurethane foam formulations.

| | Formulation A | Formulation B |
| --- | --- | --- |
| Multranol 9143[a] | 50 pbw | 75 pbw |
| Multranol 9151[b] | 50 | 25 |
| Diethanolamine | 1.5 | 1.5 |
| Silicone Surfactant | 1.75 | 1.75 |
| Water | 3.2 | 4.2 |
| Catalyst | varied | |
| Toluene Diisocyanate | 102 index | |

[a]Conventional triol (6000 mol wt) marketed by Mobay Chemical.
[b]Polyurea-filled triol (6000 mol wt) marketed by Mobay Chemical.

The catalysts were hand mixed into the formulation and poured into a 5 vent mold (20.3×23.9×11.4 cm), isothermally heated to 60° C. (140° F.). Each vent was 3.2 mm in diameter and 4.5 cm on center from each other starting 7.6 cm from the side of the mold lid and 10.2 cm in from the front edge of the mold lid. The foam was demolded after six minutes, hand crushed and allowed to post cure 24 hours before airflow measurements were made in an Amscor Porosity Testor. Density determinations were made by standard ASTM Method D-3574.

| | Run | | | | | | | | |
| --- | --- | --- | --- | --- | --- | --- | --- | --- | --- |
| | A1 | A2 | A3 | A4 | A5 | A6 | A7 | A8 | A9 |
| Formulation A | 106.45 | → | → | → | → | → | → | → | → |
| DABCO 33-LV[a] | 0.50 | 0.36 | → | → | → | → | → | → | → |
| BDMAEE | 0.15 | 0.24 | X | X | X | X | X | X | X |
| PMDETA | X | X | 0.24 | 0.024 | 0.072 | .12 | .168 | .216 | X |
| BDMAPMA | X | X | X | 0.216 | 0.168 | .12 | .072 | .024 | .24 |
| Density (pcf) | 2.17 | 2.15 | 2.08 | 2.19 | 2.12 | 1.96 | 2.06 | 2.12 | 2.10 |
| Airflow (cfm) | 1.28 | 1.45 | 1.34 | 2.20 | 1.98 | 1.68 | 1.73 | 2.26 | 2.38 |

[a]33 wt % triethylenediamine in dipropylene glycol.

Run A4 which used a 10/90 ratio of PMDETA/BDMAPMA exhibited excellent airflow values compared to the controls A1 and A2, but was undercured as evidenced by its taking a permanent handprint at demold. Similar results were obtained with Runs A8 and A9. As the BDMAPMA level increased beyond about 75 parts, the foam became more undercured. These results define the effective ratio for the PMDETA and BDMAPMA.

The experiment was repeated using a higher water level formulation which would be more sensitive to undercure conditions.

| | Run | | | | | | | | |
| --- | --- | --- | --- | --- | --- | --- | --- | --- | --- |
| | B1 | B2 | B3 | B4 | B5 | B6 | B7 | B8 | B9 |
| Formulation B | 107.45 | → | → | → | → | → | → | → | → |
| DABCO 33-LV | 0.50 | 0.36 | → | → | → | → | → | → | → |
| BDMAEE | 0.15 | 0.24 | X | X | X | X | X | X | X |
| PMDETA | X | X | 0.24 | .024 | .074 | .12 | .168 | .216 | X |
| BDMAPMA | X | X | X | .216 | .168 | .12 | .072 | .024 | .24 |
| Density (pcf) | 1.60 | 1.56 | 1.68 | 1.61 | 1.65 | 1.52 | 1.66 | 1.74 | 1.74 |
| Airflow (cfm) | 2.06 | 2.11 | 1.92 | 2.91 | 2.73 | 2.39 | 2.45 | 2.40 | 3.04 |

Similar results were seen in this experiment where higher water levels were used to make the foams. The result of the additional water is to significantly increase the volume of gas generated by the reaction of water with isocyanate resulting in a higher rising velocity and yielding a foam of less density. Runs B4, B8 and B9 which have PMDETA/DMAPMA ratios of 10/90, 90/10 and 0/100, respectively, all exhibited moderate foam collapse and the indication of undercure. In a "high" water molded foam application, where rising foam velocities are high, collapse occurs because the gelling or polymerization reaction is trailing the blowing reaction causing the forming cells to expand to their rupture point. Adding more silicone surfactant can minimize the effect, but the final foam will have poor airflow negating the desired effect of the catalyst. Run B5 shows the combination of PMDETA/DMAPMA is very close to the desired performance edge because the foam is starting to show instability, i.e. slight collapse at the vent holes.

STATEMENT OF INDUSTRIAL APPLICATION

The present invention provides a catalyst composition which increases the cell openness of polyurethane foam products.

I claim:

1. A blowing catalyst composition consisting essentially of
   (a) 25 to 80 wt % pentamethyldiethylenetriamine and
   (b) 20 to 75 wt % bis(dimethylaminopropyl)methylamine.

2. The composition of claim 1 consisting essentially of
   (a) 30 to 70 wt % pentamethyldiethylenetriamine and
   (b) 30 to 70 wt % bis(dimethylaminopropyl)methylamine.

3. The composition of claim 1 consisting essentially of
   (a) 50 wt % pentamethyldiethylenetriamine and
   (b) 50 wt % bis(dimethylaminopropyl)methylamine.

4. The catalyst composition of claim 1 further containing a gelling catalyst.

5. The catalyst composition of claim 4 in which triethylenediamine is the gelling catalyst.

6. The catalyst composition of claim 2 further containing gelling catalyst.

7. The catalyst composition of claim 6 in which triethylenediamine is the gelling catalyst.

* * * * *